May 24, 1955

B. YELLIN 2,708,900

BIRD CAGE

Filed June 21, 1954

Inventor
Bernard Yellin
by Bair, Freeman & Molinare
Attys.

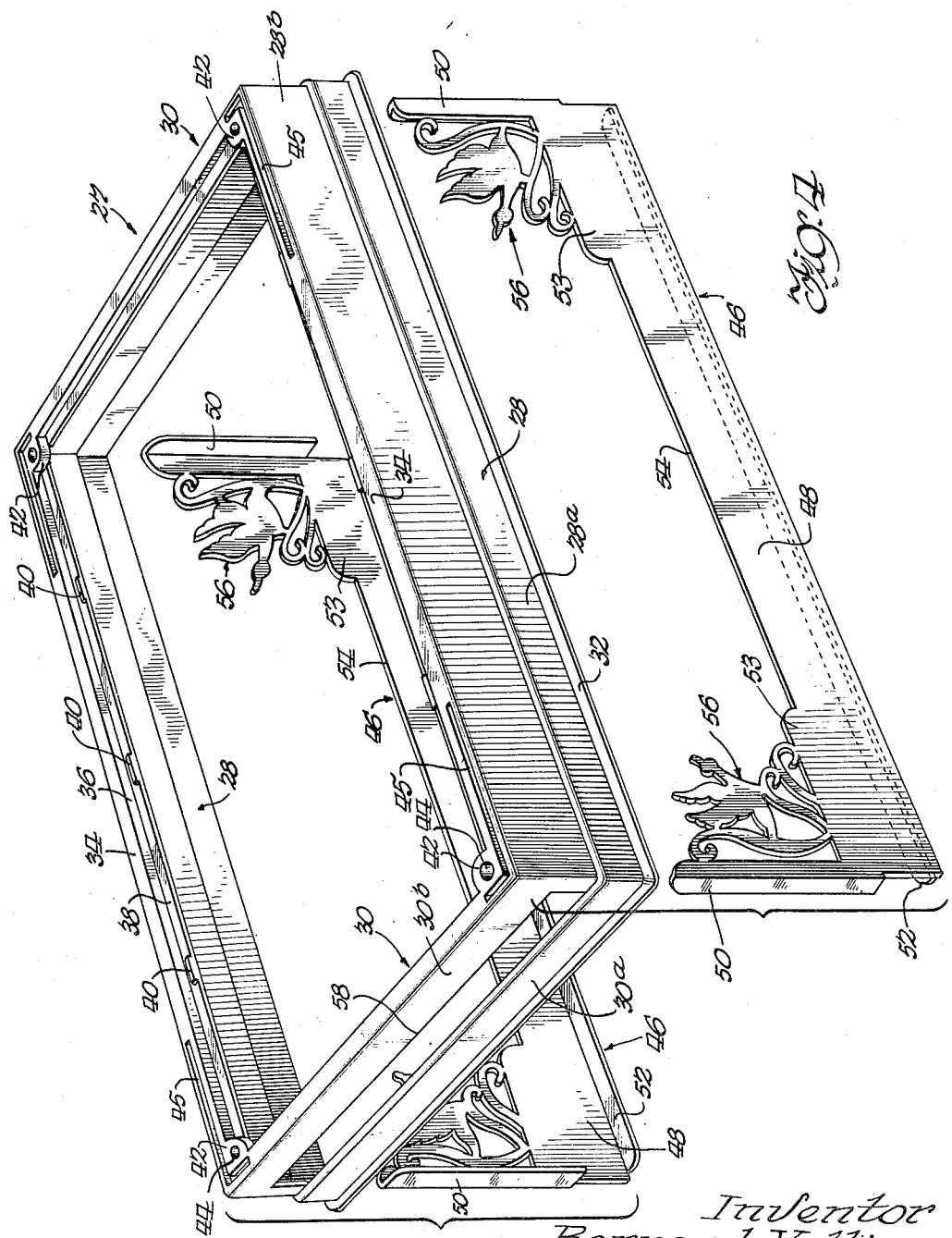

United States Patent Office 2,708,900
Patented May 24, 1955

2,708,900

BIRD CAGE

Bernard Yellin, Chicago, Ill., assignor to Bernard Edward Co., Chicago, Ill., a corporation of Illinois Application June 21, 1954, Serial No. 438,003

5 Claims. (Cl. 119—17)

This invention relates to a novel bird cage construction and more particularly to a novel combination of bird cage and base therefor.

One object of this invention is to provide a bird cage of novel construction.

Another object of this invention is to provide a combination bird cage and base therefor that is particularly adapted for ease and simplicity of assembly and is thereby characterized by its inexpensiveness of construction.

According to one feature of this invention, a bird cage with foraminous sides formed of metal, or plastic, is provided in combination with a plastic base and a removable floor for the cage carried by the base, and removable plastic barriers are provided for preventing debris from being scattered through the sides of the cage.

Thus, a further object of this invention is to provide a combination bird cage and base therefor with novel features of construction, the parts of which cooperate with each other to provide a novel bird cage construction.

According to another novel feature of this invention, there is provided a bird cage having removable debris barriers which permits cleaning of said debris barriers without requiring removal of the bird from the cage as is required in bird cages used heretofore.

Thus, another object of this invention is to provide a bird cage having removable debris barriers which may be cleaned without having to remove the bird from the bird cage.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

Figure 4 is an exploded perspective view of some of the elements of the base of the bird cage.

Figure 1:
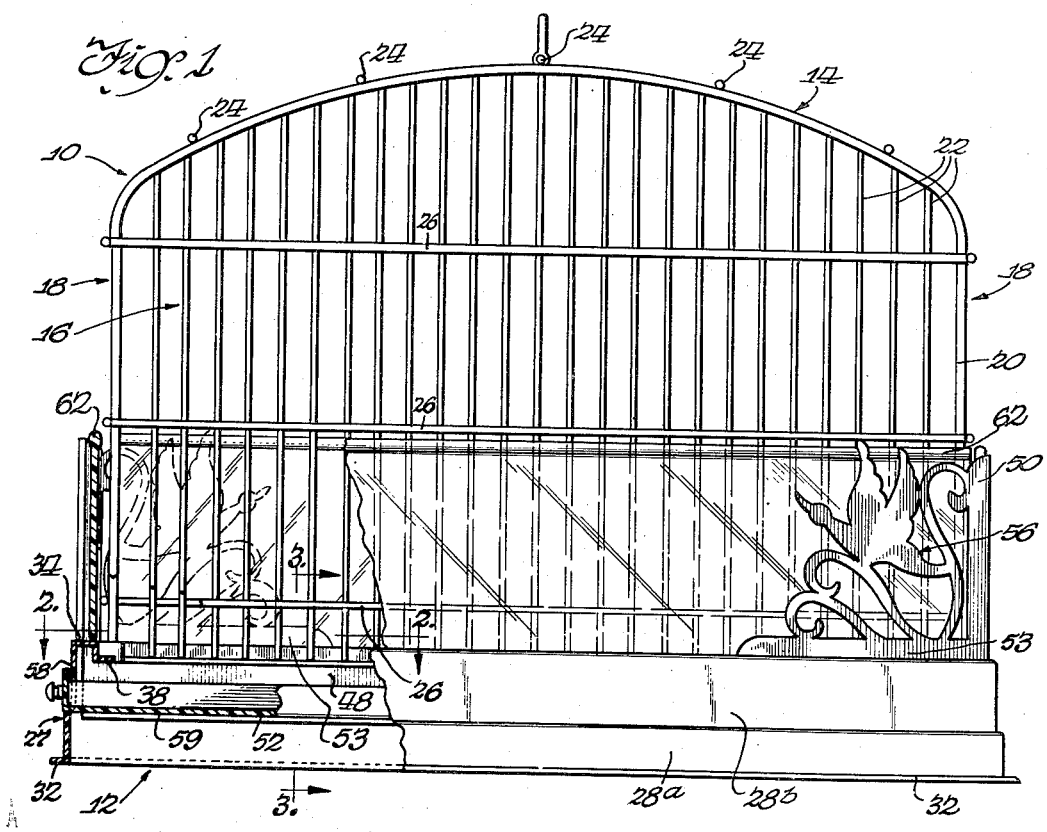
Figure 1 is a side elevation of a bird cage embodying the invention.
Figure 2:
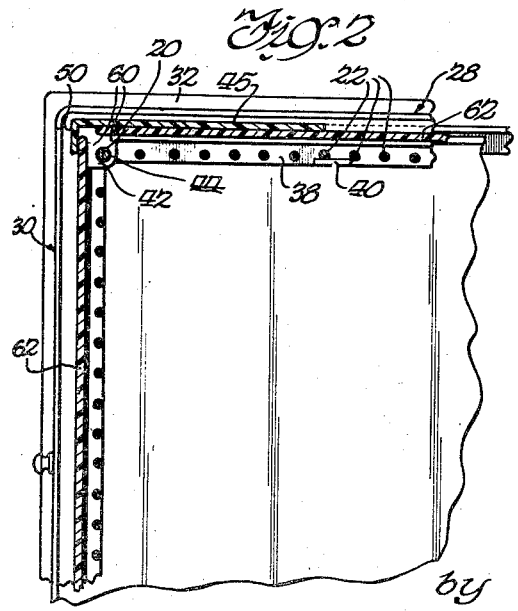
Fig. 2 is an enlarged fragmentary cross-section view taken on line 2—2 of Figure 1.

Referring now to the figures, there is shown a bird cage 10 mounted on a base generally indicated at 12. The cage 10 includes a top 14, and foraminous side walls 16 and end walls 18. The cage is made up of a pair of spaced heavy edge wires 20 and a number of cross wires of relatively smaller sizes. The cross wires include vertical cross wires 22, top cross wires 24, and side cross wires 26. The cage is preferably made of a chrome plated metal, and the various wires may be welded or appropriately brazed together. The cage may also be made of plastic, if desired.

The base 12 is rectangular, or polygonal, in form and includes a frame 27 having upright side walls 28 and end walls 30. The bottom edge of the walls of the base are flanged at 32 to form a support. The frame 27 is formed of plastic molded to the particular shape shown.

The upright walls 28 and 30 of the frame 27 are formed to define lower wall portions a, and upper wall portions b offset inwardly with respect to the lower portions a. At the upper edge, the walls turn inwardly to form an elongated outer upper ledge 34 extending inwardly of said upright wall portions a and b, and then turn downwardly to form an upright wall, or member, 36, and then turn inwardly again to form an elongated inner lower ledge 38 located inwardly of said outer ledge 34. At the inner edge of the ledge 38 there are formed a plurality of small spaced upright flanges 40.

At each corner of the ledge 38 there is an enlargement or boss 42 having a bore 44 therethrough. Formed in the upper ledge 34 at each corner of the base 12 is an L-shaped slot 45 so positioned that the long leg of the L-slot is in the long side of the rectangular base.

Figure 3:
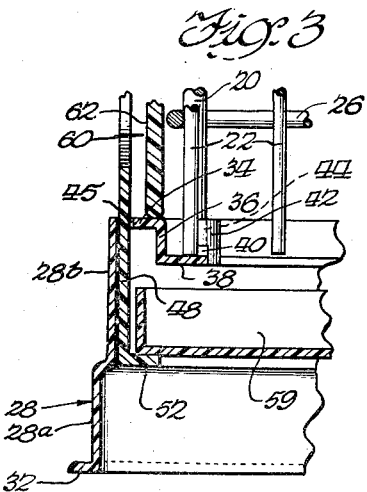
Figure 3 is an enlarged fragmentary cross-section view taken on line 3—3 of Figure 1.

The base 12 also includes a pair of elongated inserts generally indicated at 46, and best seen in Figure 4. Each insert 46 includes an upright wall portion 48, upright elongated corner members 50 at each end of the insert, and a horizontal flange 52 at the lower edge of the wall 48. The wall portion 48 is adapted to lie immediately adjacent the upper wall portion 28b, as best seen in Figure 3. The corner members 50 are angle-shaped in cross section.

The wall 48 is preferably formed of plastic and, when so formed, has molded integral therewith, adjacent the ends thereof, upright segments 53 which extend above the upper edge 54 of the wall 48. These segments 53 preferably have an ornamental decoration 56 positioned thereon between segment 53 and one leg of the angle-shaped corner member 50.

In assembling the inserts 46 on the frame 27 the upper portions of the angle-shaped members 50 are inserted into the L-shaped slots 45 and the insert 46 is then pushed upwardly until the upper edge 54 of the wall 48 engages the lower side of the upper ledge 34. The long leg of the L-slot 45 accommodates the passage therethrough of the ornamental decoration 56 and segment 53. The inserts 46 are then secured to the frame 27 by any appropriate means, such as by gluing, or by thermoplastic means.

Referring back to the frame 27, one end wall of the frame 27 has a drawer receiving aperture 58 formed therein, with the lower edge of said aperture 58 being appropriately aligned, or in register, with the inwardly facing flanges 52 of the inserts 46. The flanges 52 serve as supports or rails for a sliding drawer 59 that is inserted through the aperture 58 and which serves as the floor of the cage. The drawer 59 receives the bird droppings and may be easily removed to permit cleaning thereof. The drawer 59 is of substantially rectangular contour and is at least of dimensions to register with the space below the cage 10.

When the cage 10 is mounted on frame 27, the lower edges of the side walls 16 and of the end walls 18 rest on the lower ledge 38 of the base with the ends of the edge wires 20 force-fitted into the bores 44 to provide means for frictionally retaining the cage 10 on the base 12. The upright flanges 40 and the opposed wall 36 cooperate to define upright portions disposed on opposite sides of the ledge 38 adapted to engage the lower ends of the cage walls for restricting movement of the bird cage relative to the ledge 38.

When the bird cage 10 is mounted on base 12, the legs of the angle-shaped corner member 50 are spaced from the walls of cage 10, thereby defining recesses, or channels, 60 therebetween. To provide a barrier against the lateral discharge of debris from the cage, there are provided a plurality of barrier segments 62 of some appropriate material, such as a transparent plastic or the like, which are inserted into the channels 60 and are supported on the upper ledge 34 of the base. These barrier segments collectively surround the lower portions of the sides of the cage 10 and are movable vertically in the recesses 60 to afford removal of the barrier segments 62 for the purpose of cleaning.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. In combination, a bird cage having a top, and generally upright sides depending from said top; and a base for said bird cage upon which said bird cage is removably mounted, said base comprising upright walls surrounding a space above which said bird cage is to be positioned, an elongated cage supporting ledge at the upper ends of said upright walls positioned inwardly of said walls and adapted to have the lower edges of the upright bird cage rest thereon, one wall of said base having a drawer receiving aperture therein, inwardly extending flanges on opposite sides of said base positioned in register with the lower edge of said drawer receiving aperture, and a drawer slidably mounted in said aperture and supported by said flanges and being of a dimension to register with the space below said bird cage to serve as a removable floor for said bird cage, and spaced members extending upwardly from along opposite longitudinal edges of said ledge adapted to have portions of the bird cage sides positioned therebetween and adapted to engage said bird cage sides to restrict relative movement between the bird cage and said ledge.

2. In combination, a bird cage having a top, generally upright sides depending from said top, and downwardly extending mounting pins at the lower edges of said sides; and a base for said bird cage upon which said bird cage is removably mounted, said base comprising upright walls surrounding a space above which said bird cage is to be positioned, an elongated cage supporting ledge at the upper ends of said upright walls positioned inwardly of said walls and adapted to have the lower edges of the upright bird cage rest thereon, one wall of said base having a drawer receiving aperture therein, inwardly extending flanges on opposite sides of said base positioned in register with the lower edge of said drawer receiving aperture, a drawer slidably mounted in said aperture and supported by said flanges and being of a dimension to register with the space below said bird cage to serve as a removable floor for said bird cage, and said cage supporting ledge having recesses therein for receiving said mounting pins therein.

3. In combination, a bird cage having a top, generally upright foraminous sides depending from said top, and downwardly extending mounting pins at the lower edges of said sides; and a base for said bird cage upon which said bird cage is removably mounted, said base comprising upright walls surrounding a space above which said bird cage is to be positioned, an elongated cage supporting ledge at the upper ends of said upright walls extending inwardly of said walls and adapted to have the lower edges of the upright sides of said bird cage rest thereon, said cage supporting ledge having recesses therein for receiving said mounting pins, said recesses and mounting pins being dimensioned to provide a friction fit for retaining the cage in position on said base, spaced upright members extending upwardly from opposite longitudinal edges of said ledge adapted to have portions of the bird cage sides positioned therebetween and adapted to restrict relative movement between the bird cage and the ledge, and a removable drawer mounted on said base and serving as the floor for said bird cage.

4. In combination, a polygonal bird cage having a top, generally upright foraminous sides depending from said top and downwardly extending mounting pins at the lower edges of said sides; and a polygonal base for said bird cage comprising upright walls surrounding a space above which said bird cage is to be positioned, a polygonal cage supporting ledge at the upper ends of said upright walls extending inwardly of said walls and adapted to have the lower edges of the upright sides of said polygonal bird cage rest thereon, said cage supporting ledge having recesses therein for receiving said mounting pins, said recesses and mounting pins being dimensioned to provide a friction fit for retaining the cage in position on said base, spaced upright members extending upwardly from opposite longitudinal edges of said ledge adapted to have portions of the bird cage sides positioned therebetween and adapted to restrict relative movement between the bird cage and the ledge, angle-shaped barrier engaging members extending upwardly from each corner of said polygonal base with the legs of the angle being disposed in spaced parallel relation to the upright sides of said cage meeting at the adjacent corner of the cage to define barrier receiving channels therebetween, a lateral barrier substantially surrounding the lower portions of the foraminous sides of said cage and removably positioned on said base within said barrier receiving channels, and a removable drawer mounted on said base and serving as the floor for said bird cage.

5. In combination, a bird cage having a top, generally upright foraminous sides depending from said top and downwardly extending mounting pins at the lower edges of said sides; and a base for said bird cage comprising upright walls surrounding a space above which said bird cage is to be positioned, an elongated outer ledge at the upper ends of said upright walls extending inwardly of said walls, a second elongated ledge below said upper ledge and positioned inwardly of said outer ledge, said second ledge being a cage supporting ledge adapted to have the lower edges of the upright sides of said bird cage rest thereon, said cage supporting ledge having recesses therein for receiving said mounting pins, said recesses and mounting pins being dimensioned to provide a friction fit for retaining the cage in position on said base, spaced upright members extending upwardly from opposite longitudinal edges of said cage supporting ledge adapted to have portions of the bird cage sides positioned therebetween and adapted to restrict relative movement between the bird cage and the ledge, barrier engaging members extending upwardly from said base and being disposed in spaced relation to the upright sides of said cage to define barrier receiving channels therebetween, a lateral barrier substantially surrounding the lower portions of the foraminous sides of said cage and removably positioned on said outer ledge within said barrier receiving channels, and a removable drawer mounted on said base and serving as the floor for said bird cage.

References Cited in the file of this patent

UNITED STATES PATENTS

| | | |
|---|---|---|
| 2,120,262 | Rodess | June 14, 1938 |
| 2,178,117 | Hillenek | Oct. 31, 1939 |
| 2,190,119 | Hoefler | Feb. 13, 1940 |
| 2,221,840 | Little | Nov. 19, 1940 |